(12) United States Patent
Kim et al.

(10) Patent No.: US 8,184,713 B2
(45) Date of Patent: May 22, 2012

(54) DE-BLOCKING FILTERING METHOD OF IMAGE DATA AND DE-BLOCKING FILTER

(75) Inventors: Han-Sang Kim, Suwon-si (KR); Young-Hun Joo, Yongin-si (KR); Kwang-Pyo Choi, Anyang-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1252 days.

(21) Appl. No.: 11/974,964

(22) Filed: Oct. 17, 2007

(65) Prior Publication Data

US 2008/0095244 A1    Apr. 24, 2008

(30) Foreign Application Priority Data

Oct. 20, 2006    (KR) .................. 10-2006-0102295

(51) Int. Cl.
*H04N 7/12*    (2006.01)

(52) U.S. Cl. .................. 375/240.24; 375/240.29

(58) Field of Classification Search .................. None
See application file for complete search history.

(56) References Cited

U.S. PATENT DOCUMENTS

| | | | | |
|---|---|---|---|---|
| 7,496,141 B2* | 2/2009 | Kwon et al. | .............. | 375/240.03 |
| 7,869,523 B2* | 1/2011 | Joch et al. | .............. | 375/240.29 |
| 7,907,667 B2* | 3/2011 | Sun et al. | .............. | 375/240.18 |
| 7,911,538 B2* | 3/2011 | Ha et al. | .............. | 348/607 |
| 8,005,151 B2* | 8/2011 | Joch et al. | .............. | 375/240.29 |
| 8,040,957 B2* | 10/2011 | Sun et al. | .............. | 375/240.29 |
| 2005/0013494 A1* | 1/2005 | Srinivasan et al. | .............. | 382/233 |
| 2005/0084012 A1* | 4/2005 | Hsu et al. | .............. | 375/240.12 |
| 2005/0244063 A1* | 11/2005 | Kwon et al. | .............. | 382/233 |
| 2006/0171472 A1 | 8/2006 | Sun et al. | | |
| 2006/0233253 A1 | 10/2006 | Shi et al. | | |
| 2006/0268988 A1* | 11/2006 | Sun et al. | .............. | 375/240.16 |
| 2007/0076797 A1* | 4/2007 | Lee et al. | .............. | 375/240.24 |
| 2007/0098278 A1* | 5/2007 | Sun et al. | .............. | 382/236 |
| 2007/0201564 A1* | 8/2007 | Joch et al. | .............. | 375/240.29 |
| 2007/0237241 A1* | 10/2007 | Ha et al. | .............. | 375/240.27 |

FOREIGN PATENT DOCUMENTS

| | | |
|---|---|---|
| KR | 2003-86076 | 11/2003 |
| KR | 2005-18730 | 2/2005 |
| KR | 2006-11069 | 2/2006 |

OTHER PUBLICATIONS

ITU-T Telecommunications Standardization Sector; "H.26L Test Model Long Term No. 6 (TML-6) Draft 0;" Jan. 9, 2001; . . . .

* cited by examiner

*Primary Examiner* — Michael J Moore, Jr.
(74) *Attorney, Agent, or Firm* — Cha & Reiter, LLC

(57) ABSTRACT

A deblocking filtering method for image data and a deblocking filter. According to the deblocking filtering method for image data and the deblocking filter, when computation of Boundary Strength (BS) values for each boundary based on one of horizontal and vertical directions from input image data is completed, it is possible to estimate BS values for each boundary based on a direction different from the currently selected direction by using the computed BS values. Further, deblocking filtering is performed based on corresponding directions according to the estimated values, so that the deblocking filtering can be completely performed with only a BS value of boundaries based on a selected one direction. Consequently, a BS value computation process necessarily required in a deblocking filtering process can be considerably reduced, and thus time required in the operation process of a deblocking filter can also be considerably reduced.

13 Claims, 10 Drawing Sheets
(5 of 10 Drawing Sheet(s) Filed in Color)

DE-BLOCKING FILTERING METHOD OF IMAGE DATA AND DE-BLOCKING FILTER

CLAIM OF PRIORITY

This application claims the benefit of the earlier filing date, pursuant to 35 USC 119, that that patent application entitled "Deblocking Filtering Method Of Image Data And Deblocking Filter," filed in the Korean Intellectual Property Office on Oct. 20, 2006 and assigned Serial No. 2006-102295, the contents of which are hereby incorporated by reference.

BACKGROUND OF THE INVENTION

1. Field of the Invention

The present invention relates to an H.264 coder and decoder, and more particularly to a deblocking filtering method and a deblocking filter for performing deblocking filtering when decoding the original image data.

2. Description of the Related Art

Generally, since a deblocking filter compresses and encodes image data by the block in a video coding standard such as an H.264 scheme, and then decodes the coded data, blocking artifacts may occur in a restored image. Such blocking artifacts are mainly caused by two factors. In relation to the first factor, block-based encoding performs Discrete Cosine Transform (DCT) and quantization on a block of constant size causes data loss. This is because the transform and the quantization are independently performed without considering correlation among adjacent blocks or pixels. In relation to the second factor, in a process of estimating a motion vector by the block and compensating for images, pixels belonging to one block have the same motion vector.

In such a case, a deblocking filter reduces the boundary error of a block occurring in such block-based coding, thereby improving the quality of the finally restored image.

FIG. 1 is a flow diagram illustrating a deblocking filtering process performed by a conventional deblocking filter.

Referring to FIG. 1, if image data is input, the conventional deblocking filter divides the input image data into macro blocks in step 100, wherein each of the macro blocks includes a predetermined number of pixel blocks. Generally, such a macro block includes 16 (4×4) pixel blocks.

In step 102, the deblocking filter selects one of the divided macro blocks according to a preset order. In step 104, the deblocking filter selects two boundary blocks based on one of horizontal boundaries within the macro block, i.e. two pixel blocks horizontally connected adjacent to the selected horizontal boundary according to a preset order. Herein, the boundary denotes a boundary (i.e. an edge) of a vertical or horizontal direction between two pixel blocks adjacent in a vertical or horizontal direction. The boundary block denotes a pixel block adjacent to the currently selected boundary selected in order to compute the Boundary Strength (BS) value of the currently selected boundary.

TABLE 1

| 1  | 2  | 3  | 4  |
|----|----|----|----|
| 5  | 6  | 7  | 8  |
| 9  | 10 | 11 | 12 |
| 13 | 14 | 15 | 16 |

When macro blocks are as illustrated in Table 1, if boundary blocks are pixel blocks 5 and 6, a vertical boundary corresponds to a boundary between the pixel blocks 5 and 6. Similarly, if boundary blocks are pixel blocks 5 and 9, a horizontal boundary corresponds to a boundary between the pixel blocks 5 and 9.

In step 106, the deblocking filter computes a BS value based on a horizontal direction boundary of the selected boundary blocks. The BS value is for setting filtering strength in the filtering process by the deblocking filter. In step 106, the deblocking filter computes a BS value (i.e. a horizontal direction BS value) based on the horizontal direction boundary according to (1) whether the currently selected boundary blocks have been intra-coded, or (2) whether the selected boundary blocks are determined as different blocks based on intra-coding results when they are not intra-coded blocks, or (3) whether the boundary blocks have the same reference picture, or (4) whether a difference in motion vector values between the boundary blocks is more than a predetermined value, or (5) whether the boundary blocks correspond to the block boundary of the macro block when they are the intra-coded blocks, etc.

FIG. 2 is a flow diagram illustrating in more detail a process of computing a horizontal direction BS value for the currently selected boundary blocks in step 106.

Referring to FIG. 2, if the boundary blocks based on the horizontal direction boundary are selected, the deblocking filter determines if the currently selected boundary blocks are the intra-coded blocks in step 200. As a result of the determination in step 200, if the currently selected boundary blocks are the intra-coded blocks, the deblocking filter determines if the currently selected horizontal direction boundary corresponds to the boundary surface (i.e. edge) of the currently selected macro block in step 202. If the currently selected horizontal direction boundary corresponds to the boundary surface, the deblocking filter sets the BS value of the currently selected horizontal direction boundary to a value, e.g., 4, denoting the strongest deblocking filtering level in step 204. However, if the currently selected horizontal direction boundary does not correspond to the boundary surface, the deblocking filter sets the BS value of the currently selected horizontal direction boundary to a value, e.g., 3, less than the strongest deblocking filtering level, in step 206.

As a result of the determination in step 200, if the currently selected boundary blocks are not the intra-coded blocks, the deblocking filter confirms and compares Coded Block Pattern (CBP) values of the currently selected boundary blocks in step 208. If all the CBP values are 0, it may be determined that the blocks have no difference. However, if at least one of the CBP values is 1, it may be determined that the blocks are different.

In step 210, the deblocking filter determines if there is a difference between the currently selected boundary blocks as a result of the comparison of the CBP values. If there is a difference between the currently selected boundary blocks, the deblocking filter sets the BS value of the currently selected horizontal direction boundary to a value, e.g., 2, in step 212.

However, if there is no difference between the currently selected boundary blocks, the deblocking filter determines if the currently selected boundary blocks have the same reference picture, or if a difference in motion vector values for vertical and horizontal directions in each boundary block is more than a predetermined value in step 214. If the currently selected boundary blocks do not have the same reference picture, or if the difference in the motion vector values is more than the predetermined value, the deblocking filter sets the BS value of the currently selected horizontal direction boundary to a value, e.g., 1. in step 216. However, if the currently selected boundary blocks have the same reference picture, or if the difference in the motion vector values is less than the predetermined value, the deblocking filter sets the BS value of the currently selected horizontal direction boundary to a value, e.g., 0, thereby skipping deblocking filtering in step 218. Then, step 108 in FIG. 1 is performed.

In this way, if the BS value is computed, this becomes a BS value based on the specific direction of a specific pixel. For example, as illustrated in Table 1, if the BS value of the vertical boundary is computed, this value typically becomes the BS value of pixel 6 which is a pixel block located in the right side of the vertical boundary. If the BS value of the horizontal boundary is computed, this value typically becomes the BS value of pixel 5 which is a pixel block located in the upper side of the horizontal boundary.

Further, if the computation of the horizontal direction BS value for the currently selected boundary blocks in step 106 is completed, the deblocking filter determines if the horizontal direction BS values for all horizontal boundaries of the currently selected macro block have been computed in step 108 (returning to FIG. 1). If the horizontal direction BS values have not been computed, the deblocking filter selects other boundary blocks in step 104 and repeats step 106. However, if the computation of the BS values for all horizontal boundaries of the currently selected macro block is completed, the deblocking filter determines if steps 100, 102, 104, 106 and 108 have been performed for all macro blocks divided from the input image data, in step 110. As a result of the determination in step 110, if the horizontal direction BS values for each boundary block of all macro blocks have been completed, the deblocking filter performs a deblocking filtering process based on a horizontal direction in step 112.

If the deblocking process is completed in step 112, the deblocking filter selects one of the macro blocks divided from the image data in step 114. In step 116, the deblocking filter selects two boundary blocks based on one of the horizontal boundaries inside the currently selected macro block, i.e. two boundary blocks horizontally connected adjacent to the currently selected vertical boundary. In step 118, the deblocking filter computes the BS value in a vertical direction in a way similar to that of step 106. The difference between step 106 and step 118 is as follows: in step 106, the BS value is computed according to the correlation between two vertically connected boundary blocks, however, in step 118, the BS value is computed according to the correlation between two horizontally connected boundary blocks.

In steps 120 and 122, the deblocking filter computes vertical direction BS values for vertical boundaries of all macro blocks. If these vertical direction BS values are computed in step 122, the deblocking filter performs vertical direction filtering of each boundary block according to the computed BS values in step 124. In this way, the deblocking filtering in horizontal and vertical directions for all macro blocks of the input image data is completed.

As describe above, the conventional deblocking filter must compute the BS values for all horizontal direction boundaries of the input image data, and then repeat the BS value computation process (step 118) for computing the vertical direction boundaries. Therefore, the filtering method of the deblocking filter requires a large computation amount, which results in an increase in the time required for filtering.

SUMMARY OF THE INVENTION

Accordingly, the present invention has been made to solve the above-mentioned problems occurring in the prior art and provides additional advantages, by providing a deblocking filtering method and a deblocking filter, which can reduce a computation amount for computing BS values for vertical and horizontal direction boundary surfaces of input image data without damaging the quality of the input image data.

In accordance with one aspect of the present invention, there is provided a method for deblocking filtering of image data divided into a plurality of macro blocks, the method including the steps of computing Boundary Strength (BS) values for boundaries based on one direction selected from vertical and horizontal directions of the image data, performing filtering based on the selected direction by using the computed BS values, estimating BS values for boundaries based on the unselected direction by using the computed BS values and s performing filtering based on the unselected direction by using the estimated BS values.

In accordance with another aspect of the present invention, there is provided a deblocking filter including a block divider for dividing received image data into macro blocks with a preset size, and selecting boundary blocks based on a boundary in either a vertical direction or a horizontal direction, a BS value computation unit for computing Boundary Strength (BS) values for boundaries between the boundary blocks based on the currently selected direction, a BS value estimation unit for estimating BS values of boundary blocks based on a currently unselected direction by using the previously computed BS values of the boundary blocks, a filtering unit for performing filtering for the boundaries in the vertical or horizontal direction according to a deblocking filtering method and a controller for selecting either the vertical direction or the horizontal direction, controlling the BS value computation unit so as to compute the BS values for the boundaries based on the currently selected direction, controlling the BS value estimation unit so as to estimate the BS values for the boundaries based on the currently unselected direction by using the computed the BS values when the BS values for the boundaries based on all the currently unselected directions of the image data are computed, and controlling the filtering unit so as to perform filtering in the horizontal or vertical direction by using the computed or estimated BS values.

BRIEF DESCRIPTION OF THE DRAWINGS

The patent application file contains at least one drawing executed in color. Copies of this patent application publication with color drawing(s) will be provided by the Office upon request and payment of the necessary fee.

DETAILED DESCRIPTION OF THE INVENTION

Figure 1:
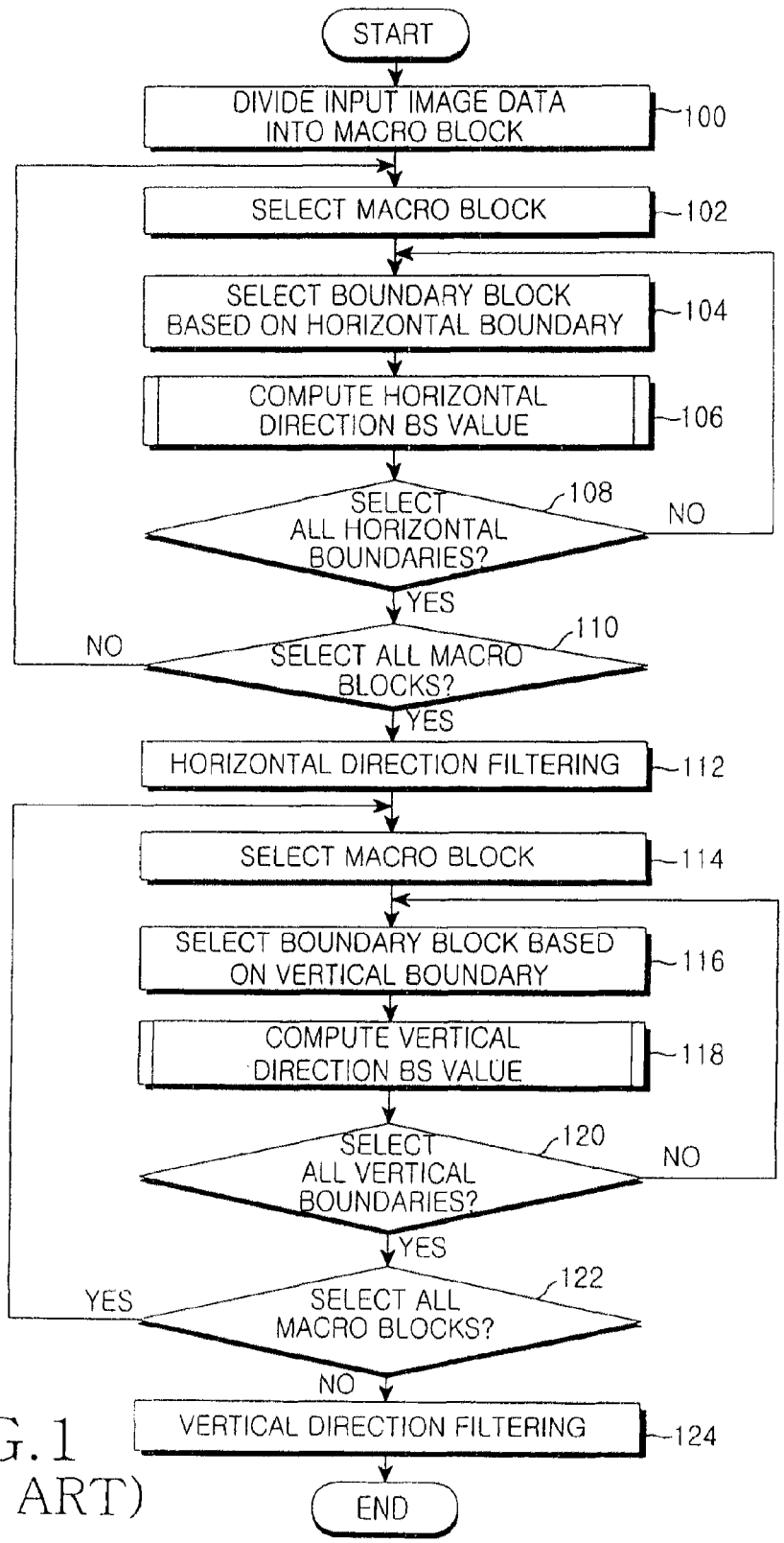
FIG. 1 is a flow diagram illustrating a conventional deblocking filtering process.
Figure 2:
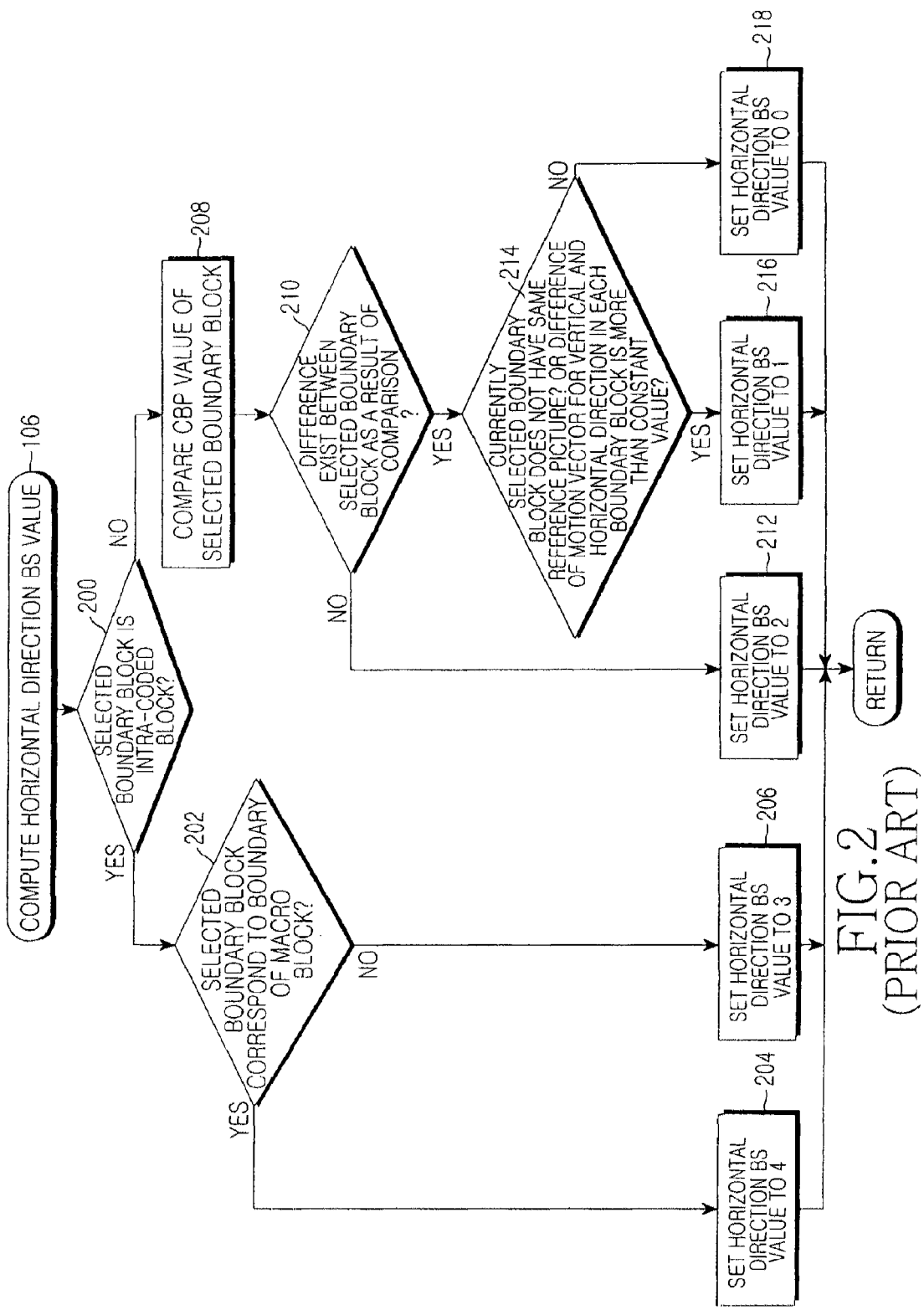
FIG. 2 is a flow diagram illustrating an exemplary process of computing horizontal direction BS values for performing horizontal direction filtering in a conventional deblocking filtering process.

Embodiments of the present invention will be described in detail herein below with reference to the accompanying drawings. It should be noted that similar components are designated by similar reference numerals although they are illustrated in different drawings. Also, for the purposes of clarity and simplicity, a detailed description of known functions and configurations incorporated herein will be omitted when it may obscure the subject matter of the present invention.

In the present invention, when computation of BS values for each boundary based on one of horizontal and vertical directions from input image data is completed, it is possible to estimate BS values for each boundary of the direction different from the currently selected direction by using the computed BS values. Further, deblocking filtering is performed based on corresponding directions according to the estimated values, so that the deblocking filtering can be completely performed with only a BS value of boundaries based on one direction. Consequently, a BS value computation process necessarily required in a deblocking filtering process can be considerably reduced, and thus time required in the operation process of a deblocking filter can also be considerably reduced.

Figure 3:
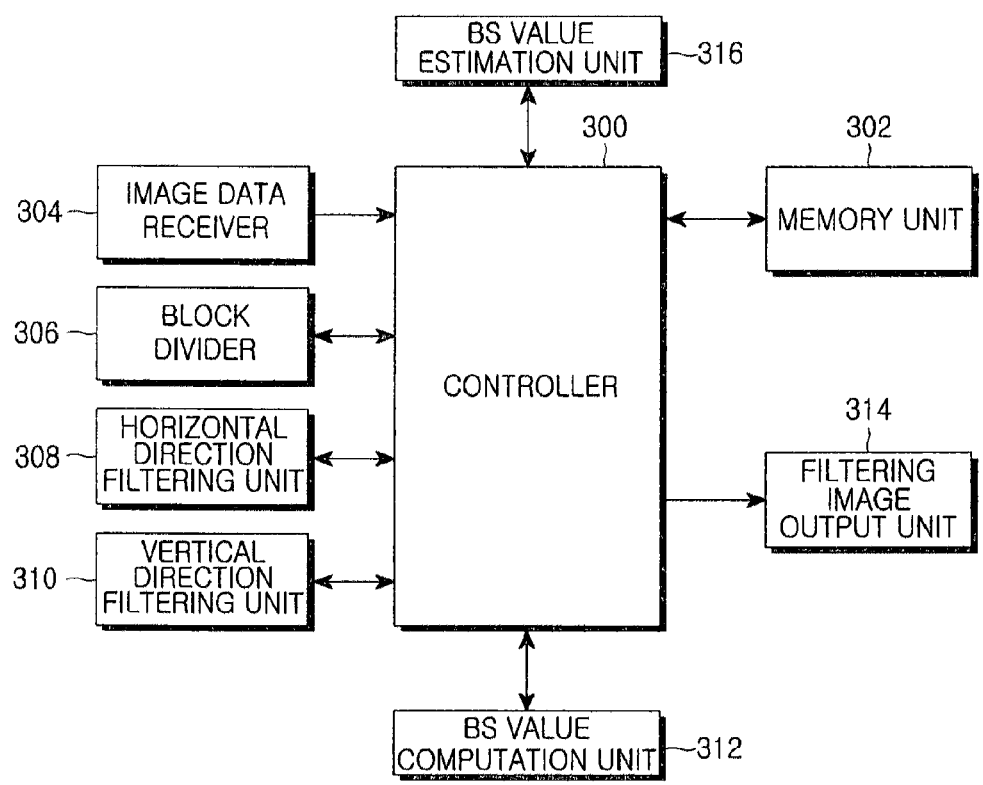
FIG. 3 is a diagram illustrating the construction of a deblocking filter according to an embodiment of the present invention.

FIG. 3 is a diagram illustrating the construction of a deblocking filter according to an embodiment of the present invention.

Referring to FIG. 3, the deblocking filter according to the embodiment of the present invention includes a controller 300, a memory unit 302, an image data receiver 304, a block divider 306, a horizontal direction filtering unit 308, a vertical direction filtering unit 310, a filtering image output unit 314, a BS value computation unit 312, and a BS value estimation unit 316, which are connected to the controller 300.

The controller 300 divides image data received from the image data receiver 304 into macro blocks, and selects one of either the horizontal and vertical directions, each of the macro blocks includes a predetermined number of pixel blocks. The controller 300 selects one of boundaries between the pixel blocks of the image data based on the currently selected direction, and then selects boundary blocks based on the selected boundary. Further, the controller 300 controls the BS value computation unit 312 to compute the BS value of a boundary based on the selected boundary blocks.

If BS values for boundaries based on the currently selected direction of all pixel blocks included in the image data are computed, the controller 300 performs deblocking filtering for each boundary based on the currently selected direction according to the currently computed BS values by using a filtering unit based on the currently selected direction of the horizontal direction filtering unit 308 and the vertical direction filtering unit 310.

Further, the controller 300 controls the BS value estimation unit 316 to estimate BS values of each boundary based on the currently unselected direction from the BS values of each boundary based on the currently selected direction. Then, the controller 300 performs deblocking filtering for boundaries based on the currently unselected direction according to the estimated BS values, and outputs image data, for which the deblocking filtering based on horizontal and vertical directions has been completed, through the filtering image output unit 314.

The memory unit 302 includes a memory, e.g., Read Only Memory (ROM), a flash memory, a Random Access Memory (RAM), etc. Of them, the ROM stores programs and various reference data for processing and control of the controller 300. The RAM functions as a working memory of the controller 300, and the flash memory provides an area for storing various renewable storage data.

The block divider 306 divides image data received as macro blocks with a preset size, and selects boundary blocks based on one of either horizontal or vertical directions from each macro block of the divided image data under the control of the controller 300.

The BS value computation unit 312 computes a BS value for a boundary between the boundary blocks under the control of the controller 300. When the currently selected direction is a horizontal direction, the BS value computation unit 312 computes a BS value of a boundary value based on the currently selected boundary blocks through a process similar to the BS value computation process of step 106 in FIG. 1. However, when the currently selected direction is a vertical direction, the BS value computation unit 312 computes a BS value for a boundary between the currently selected boundary blocks through a process similar to that of step 118.

If the computation of the BS values for boundaries among all pixel blocks in the currently selected direction is completed, the BS value estimation unit 316 estimates BS values for boundaries in the unselected direction by using the computed BS values. This uses the fact that a BS value in either a vertical direction or a horizontal direction for the specific pixel block nearly coincides with a BS value in the different direction. Accordingly, when the boundary blocks based on the boundaries in the currently unselected direction are selected, the BS value estimation unit 316 determines if the boundary blocks are blocks coded according to an intra mode. If the boundary blocks are the blocks coded according to the intra mode, the BS value estimation unit 316 determines a BS value of a boundary based on the currently unselected direction of the boundary blocks according to the computed BS values (i.e., BS values computed based on the currently selected direction) for the boundary blocks. If the boundary blocks selected based on the boundary in the currently unselected direction are not intra coded blocks, the BS value estimation unit 316 determines a BS value for a boundary between the currently selected boundary blocks according to whether the boundary of the boundary blocks corresponds to the boundary surface (boundary surface based on the currently unselected direction) of a macro block for which a BS value is currently computed.

The vertical direction filtering unit 310 or the horizontal direction filtering unit 308 performs deblocking filtering based on the BS values corresponding to the boundaries of each pixel block according to a vertical direction or a horizontal direction under the control of the controller 300. In the following description, it is assumed that deblocking filtering of the highest level is performed when the BS value is 4, deblocking filtering of the lowest level is performed when the BS value is 1, and deblocking filtering is skipped when the BS value is 0.

Figure 4:
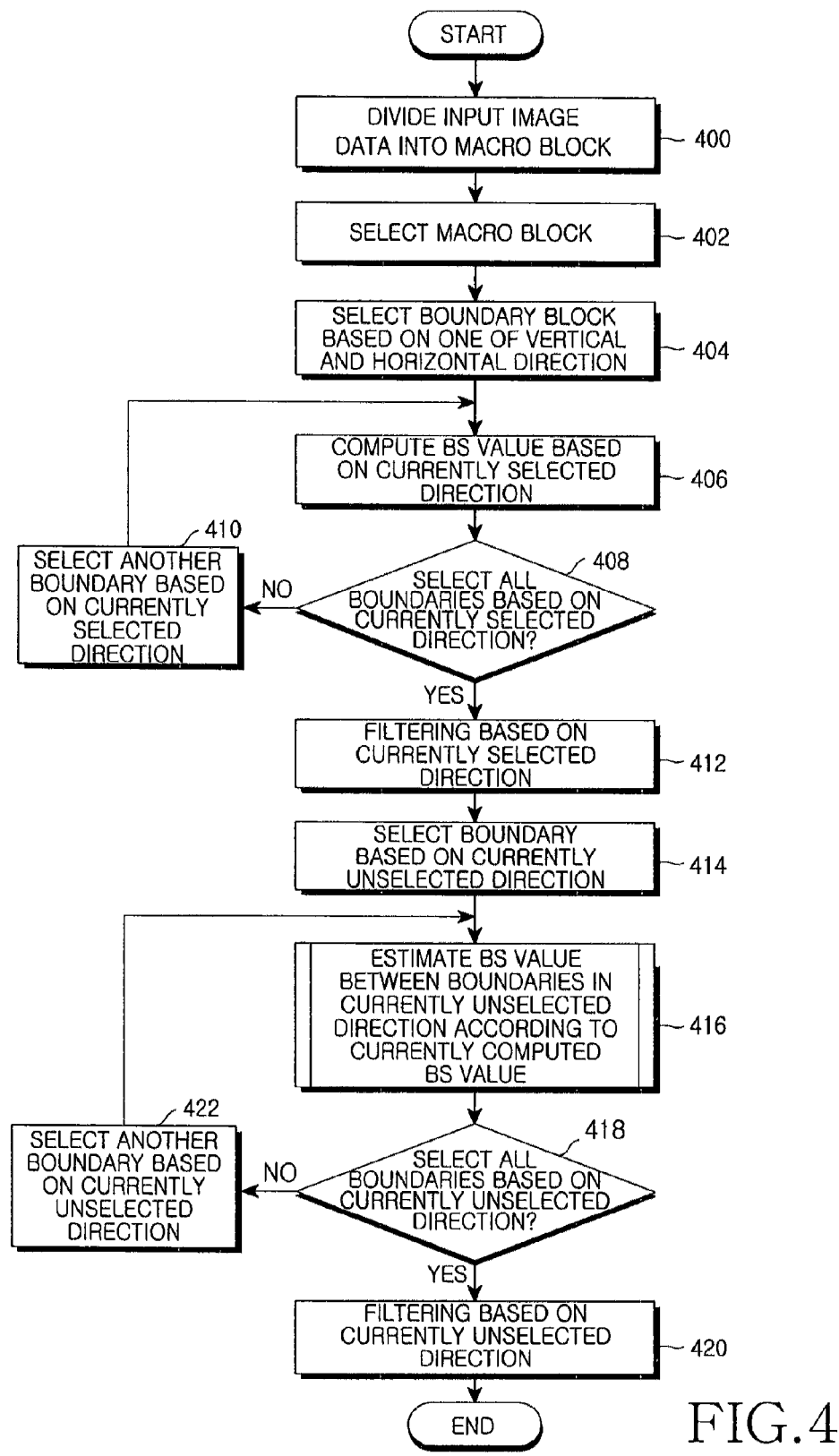
FIG. 4 is a flow diagram illustrating an exemplary deblocking filtering process performed by a deblocking filter according to an embodiment of the present invention.

FIG. 4 is a flow diagram illustrating a deblocking filtering process performed by the deblocking filter according to the embodiment of the present invention.

Referring to FIG. 4, if image data is input, the controller 300 of the deblocking filter according to the embodiment of the present invention divides the input image data into macro blocks in step 400, wherein each of the macro blocks includes a predetermined number of pixel blocks. In step 402, the controller 300 selects one of the divided macro blocks according to a preset order. In step 404, the controller 300 selects one boundary based on either a vertical direction or a horizontal direction according to a preset order.

In step 406, the controller 300 computes a BS value for boundaries of the boundary blocks based on the currently selected direction. That is, as shown in step 106 of FIG. 1, the controller 300 computes a BS value based on the boundary based on the currently selected direction according to whether the currently selected boundary blocks have been intra-coded, whether the selected boundary blocks are determined as different blocks based on intra-coding results when they are not intra-coded blocks, whether the boundary blocks have the same reference picture, whether a difference in motion vector values between the boundary blocks is more than a predetermined value, whether the boundary blocks correspond to the block boundary of the macro block when they are the intra-coded blocks, etc.

If the computation of the BS value for the currently selected boundary blocks is computed in step 406 (returning to FIG. 4), the controller 300 determines if BS values for boundaries in all currently selected directions of the currently selected macro block have been computed in step 408. If the BS values for the boundaries in all the currently selected directions have not been computed, the controller 300 selects another boundary based on the currently selected direction in step 410. Further, the controller 300 selects boundary blocks based on the currently selected boundary, and computes the BS value in a manner similar to that of the currently selected boundary as described in step 106 (see FIG. 1).

However, if the BS values for all boundaries based on the currently selected direction in the currently selected macro block have been computed in step 408, the controller 300 determines if the BS values of the boundaries based on the currently selected direction have been computed for all macro blocks of the received image data. If the BS values of the boundaries based on the currently selected direction have not been computed for all the macro blocks of the received image data, the controller 300 selects another macro block. In step 410, the controller 300 selects a boundary based on the currently selected direction from a newly selected macro block, and selects boundary blocks based on the selected boundary. Then, the controller 300 computes the BS value of the currently selected boundary again in step 406.

As a result of step 408, if the BS values for boundaries of all the currently selected directions of the image data have been computed, the controller 300 performs filtering based on the currently selected direction in step 412. In step 414, the controller 300 selects a boundary based on a direction different from the currently selected direction from the received image data, and selects boundary blocks based on the selected boundary. In step 416, the controller 300 estimates BS values for the boundaries of the direction different from the currently selected direction according to the computed BS values of the currently selected boundary blocks.

As described above, in step 416, the controller 300 estimates the BS values for the currently selected boundary according to whether boundary blocks selected based on a boundary in the currently unselected direction are blocks coded by an intra mode, and whether the currently selected boundary corresponds to the boundary surface of the macro block, for which a BS value is currently computed, when the currently selected boundary blocks are not the intra-coded blocks. Step 416 will be described in more detail with reference to FIG. 5.

If the BS values of the boundaries based on the currently unselected direction are estimated in step 416, the controller 300 determines if all boundaries based on the currently unselected direction have been selected in step 418. If the BS values for all boundaries based on the currently selected direction have been estimated from the currently selected macro block in step 416, the controller 300 determines if the BS values of boundaries based on the currently unselected direction have been estimated for all macro blocks of the received image data. If the BS values of boundaries based on the currently unselected direction have not been estimated, the controller 300 selects another macro block. Then, in step 422, the controller 300 selects a boundary based on the currently selected direction from the newly selected macro block, and selects a boundary block based on the selected boundary in step 422. Further, the controller 300 estimates the BS values of the currently selected boundary in step 416.

As a result of step 418, if BS values based on boundaries in all the currently unselected directions of the image data have been computed, the controller 300 performs filtering based on the currently unselected direction in step 420. Then, the deblocking filtering is performed for the vertical and horizontal directions of the image data, and the image data for which the deblocking filtering has been completed is output from the filtering image output unit 314.

Figure 5:
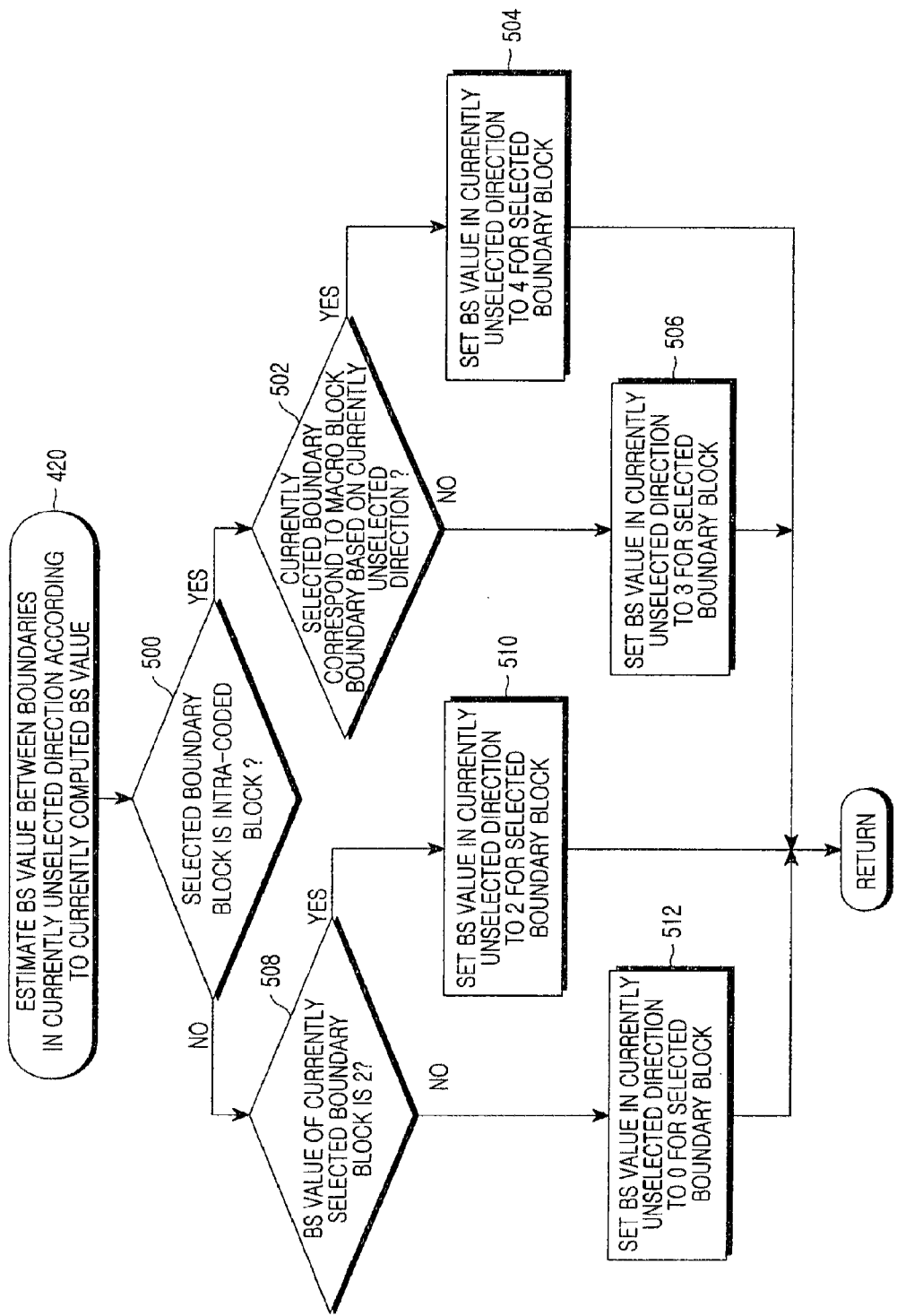
FIG. 5 is a flow diagram illustrating an exemplary process for estimating BS values in another direction by using BS values in a specific direction, which has been computed by a deblocking filter according to an embodiment of the present invention.

FIG. 5 is a flow diagram illustrating a process for estimating BS values in another direction by using BS values in a specific direction as in step 420, which has been computed by the deblocking filter according to the embodiment of the present invention.

Referring to FIG. 5, if the boundary based on the currently unselected direction is selected and the boundary blocks based on the selected boundary are selected, the controller 300 of the deblocking filter according to the embodiment of the present invention determines if the currently selected boundary blocks are intra-coded blocks in step 500. As a result of step 500, if the currently selected boundary blocks are the intra-coded blocks, the controller 300 determines if the currently selected boundary corresponds to a macro block boundary based on the currently unselected direction in step 502.

As a result of the determination in step 502, if the currently selected boundary corresponds to the macro block boundary, the controller 300 sets a BS value in the currently unselected direction to 4 for the currently selected boundary blocks in step 504. However, if the currently selected boundary does not correspond to the macro block boundary, the controller 300 sets the BS value in the currently unselected direction to 3 for the currently selected boundary blocks in step 506.

As a result of the determination in step 500, if the currently selected boundary blocks are not the intra-coded blocks, the controller 300 determines if the previously computed BS value (i.e. BS value based on the currently selected direction) of the currently selected boundary blocks has been set to 2 in step 508. If the previously computed BS value of the currently selected boundary blocks has been set to 2, the controller 300 sets the BS value in the currently unselected direction to 2 for the currently selected boundary blocks in step 510.

However, if the previously computed BS value of the currently selected boundary blocks has been set to 0 or 1 instead of 2 in step 508, the controller 300 sets the BS value in the currently unselected direction to 0 for the currently selected boundary blocks, thereby causing deblocking filtering to be skipped. This is because there is no large difference as compared to a case in which a BS value has been set to 1, i.e. the level of deblocking filtering is very low. Accordingly, when the previously computed BS value of the currently selected boundary blocks has been set to 0 or 1, the controller 300 immediately sets the BS value to 0, thereby causing deblocking filtering to be skipped.

Figure 6A:
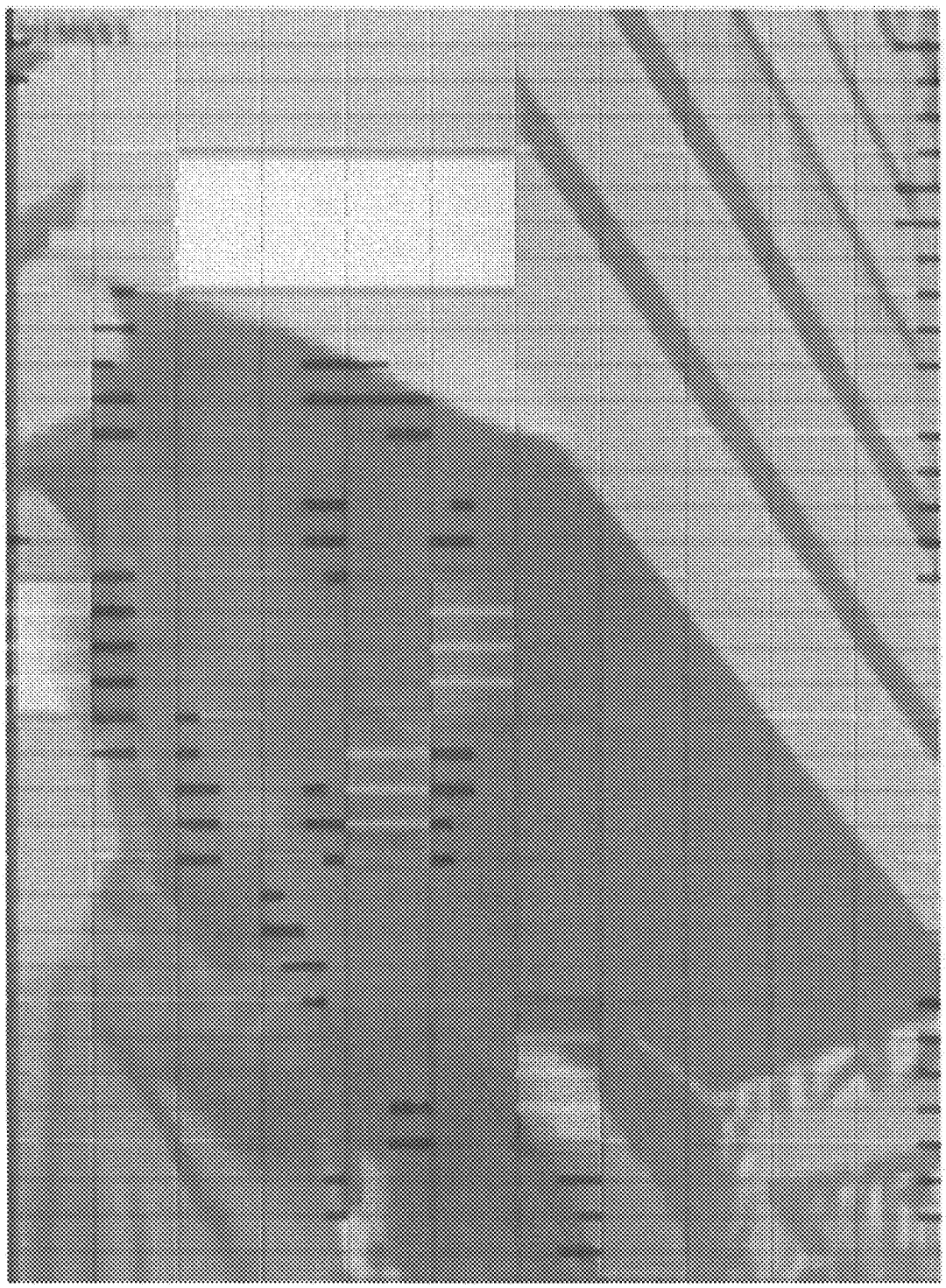
FIGS. 6a to 6c are diagrams illustrating examples of BS values computed or estimated according to an embodiment of the present invention.
Figure 6B:
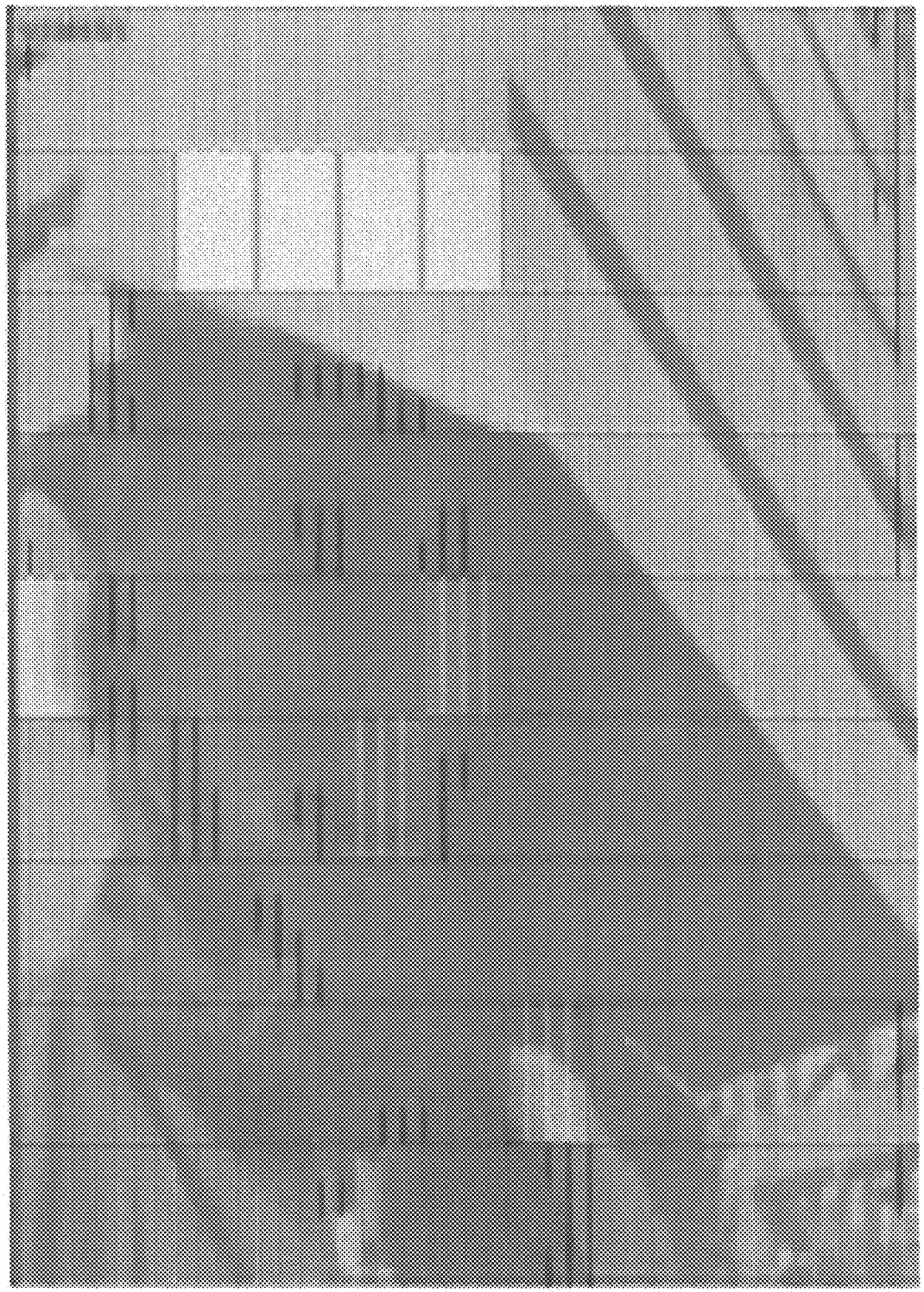
Figure 6C:
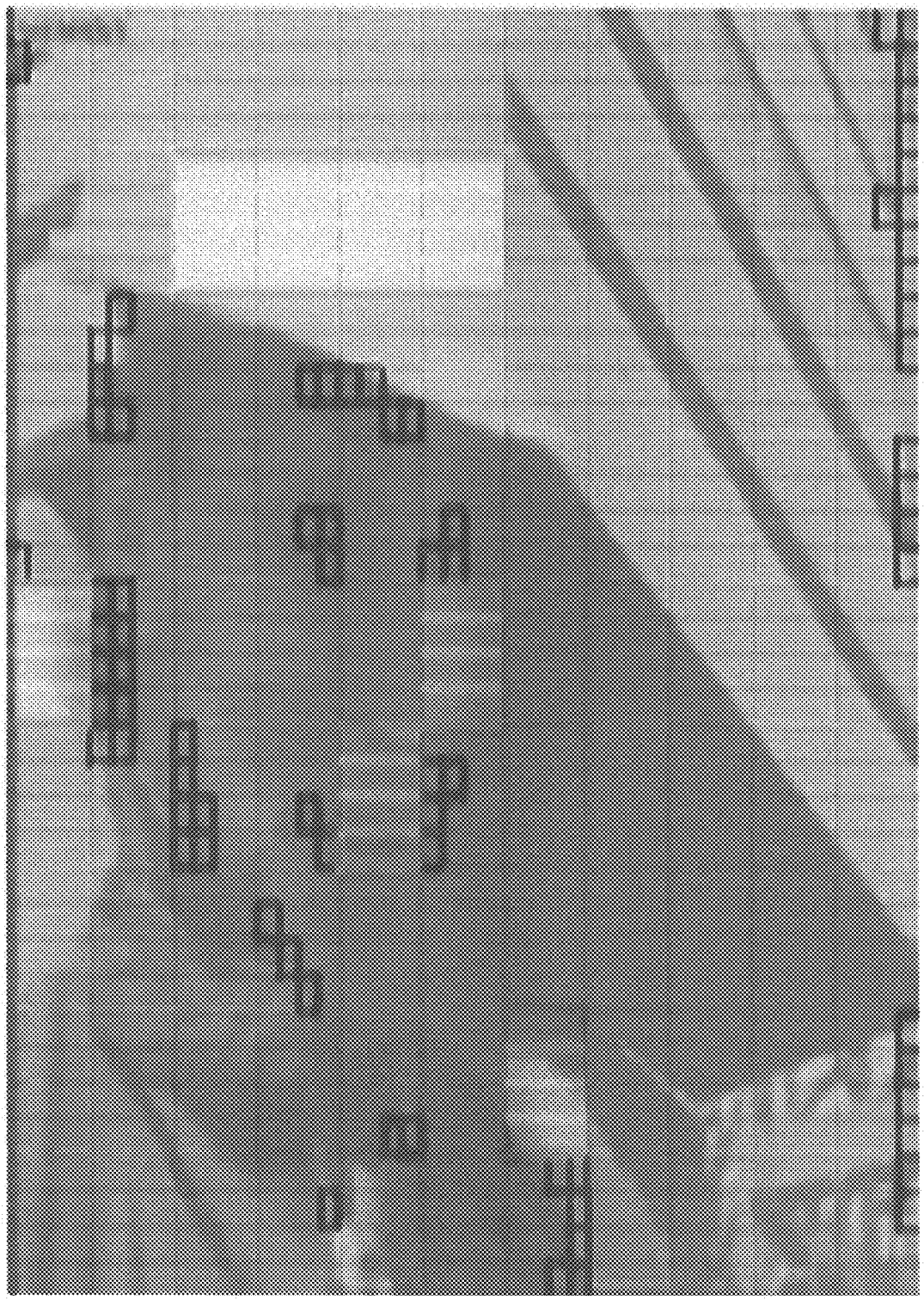
Figure 7A:
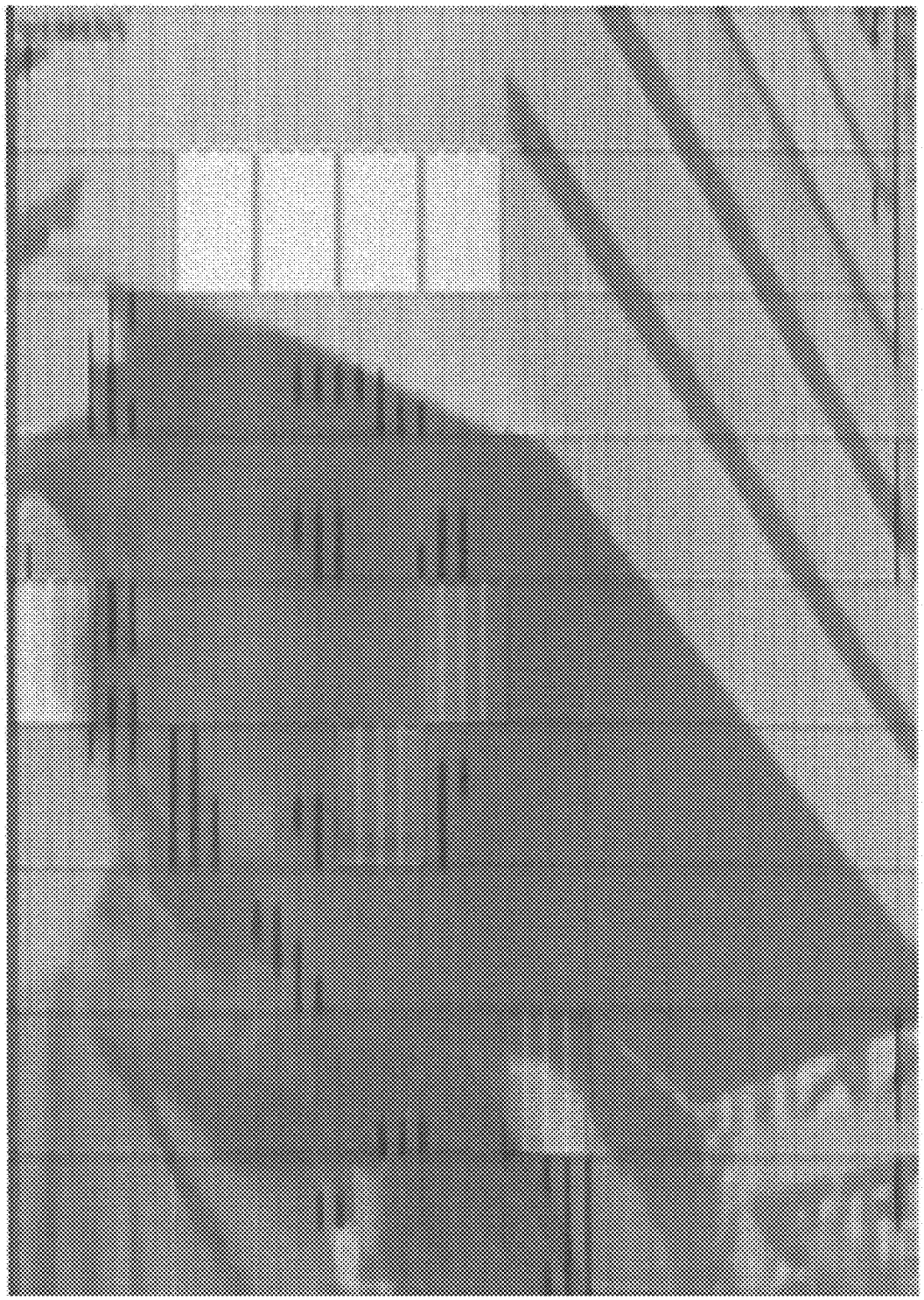
FIGS. 7a and 7b are diagrams illustrating the difference in BS values estimated according to a conventional method, and BS values estimated according to an embodiment of the present invention.
Figure 7B:
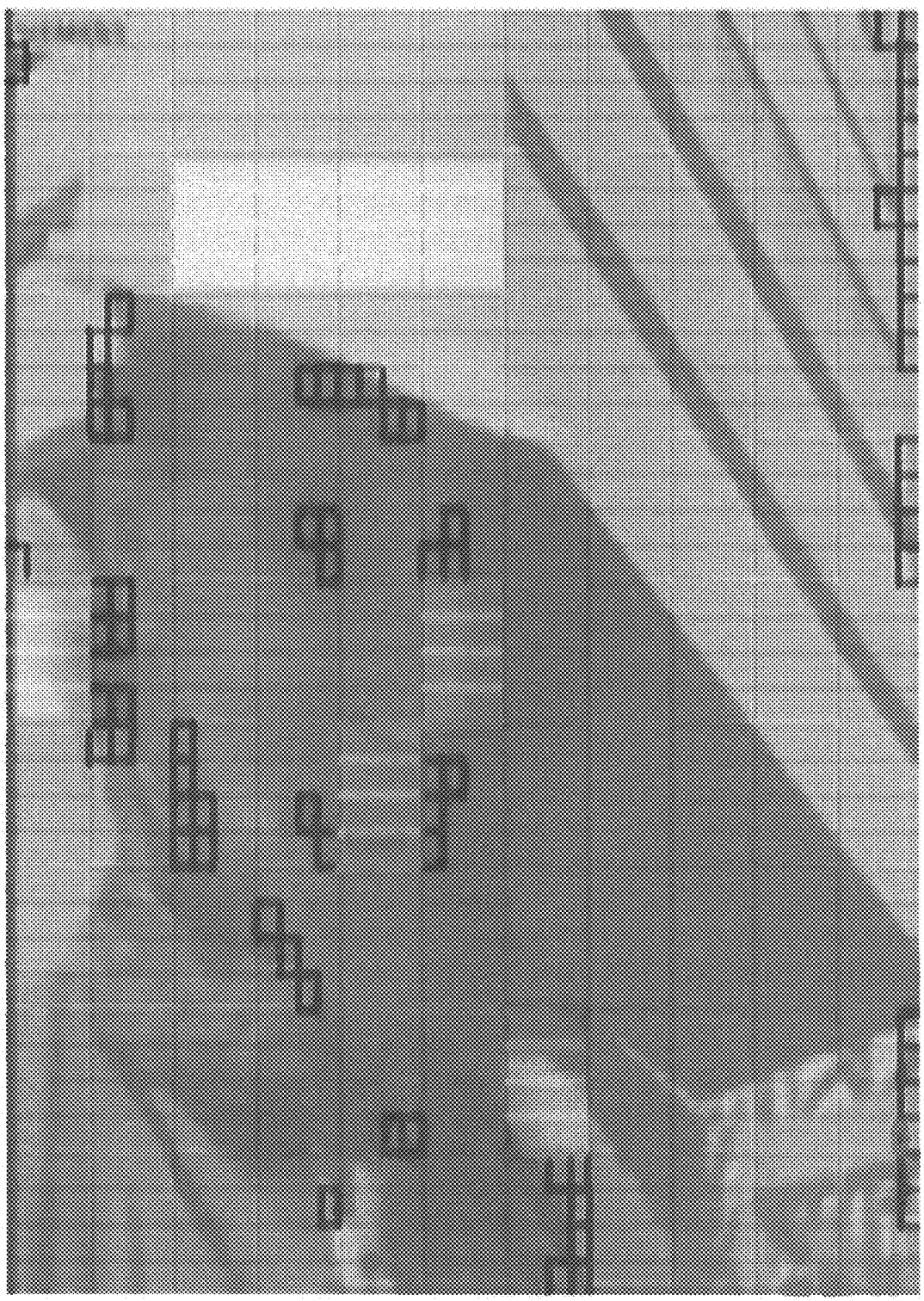

FIGS. 6a to 6c are diagrams illustrating examples of the BS values computed or estimated according to the embodiment of the present invention, and FIGS. 7a and 7b are diagrams illustrating the difference in the BS values estimated according to the conventional method, and the BS values estimated according to the embodiment of the present invention. In FIGS. 6a to 6c, and FIGS. 7a and 7b, parts expressed by red colors indicate a case where a BS value has been set to 0, parts expressed by green colors indicate a case where a BS value has been set to 1, parts expressed by blue colors indicate a case where a BS value has been set to 2, parts expressed by yellow colors indicate a case where a BS value has been set to 3, and parts expressed by sky-blue colors indicate a case where a BS value has been set to 4.

FIG. 6a illustrates BS values computed in a horizontal direction for boundaries of each pixel block, similar to a conventional deblocking filter. FIG. 6b illustrates BS values in a vertical direction estimated from the BS values in the horizontal direction according to the embodiment of the present invention. FIG. 6c illustrates results of FIGS. 6a and 6b displayed on a single screen. That is, since FIG. 6c illustrates all the BS values in the vertical and horizontal directions, rectangles are displayed as it can be seen from FIG. 6c.

FIG. 7a illustrates BS values actually computed for vertical direction boundaries of each pixel block not based on the embodiment of the present invention. FIG. 7b illustrates a comparison between BS value setup results according to the embodiment of the present invention, and actually computed results in FIG. 7a.

Comparing the BS values of FIG. 7a with the BS values of FIG. 6b, it can be understood that there is nearly no difference between them. Referring to FIG. 7b, the difference between FIG. 6b and FIG. 7b lies in that a difference has occurred only for three pixel blocks as indicated by reference numerals 700, 702 and 704.

However, the present invention reduces the computation amount required for computing BS values for vertical and horizontal direction boundary surfaces of input image data without deteriorating the quality of the image data, thereby shortening time required for a deblocking operation thereof.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although an embodiment of the present invention has been described for illustrative purposes, those skilled in the art will appreciate that various modifications, additions and substitutions are possible, without departing from the scope and spirit of the present invention as disclosed in the accompanying claims, including the full scope of equivalents thereof. For example, the instant description refers to specific values (4, 3, 2, 1 and 0). However, it would be within the knowledge of those skilled in the art to utilize other schemes to identify the levels of the boundary values and such other schemes are considered within the scope of the invention claimed.

What is claimed is:

1. A method for deblocking filtering of image data divided into a plurality of macro blocks, the method comprising the steps of:
   computing Boundary Strength (BS) values for boundaries based on a selected direction of the image data, wherein the direction is selected from the group consisting of vertical and horizontal directions;
   performing filtering based on the selected direction by using the computed BS values;
   estimating BS values for boundaries based on the unselected direction by using the computed BS values; and
   performing filtering based on the unselected direction by using the estimated BS values.

2. The method as claimed in claim 1, wherein the step of computing the BS values comprises the steps of:
   dividing the macro blocks into a plurality of blocks;
   sequentially selecting the macro blocks, and selecting one of the boundaries based on the currently selected direction in boundaries of the currently selected macro block;
   selecting boundary blocks based on the currently selected boundary;
   determining if the boundary blocks are intra-coded blocks;
      if the boundary blocks are the intra-coded blocks, primarily setting a BS value of the currently selected boundary to 4 or 3 according to whether the currently selected boundary corresponds to a macro block boundary;
      if the boundary blocks are not the intra-coded blocks, comparing Coded Block Pattern (CBP) values of the boundary blocks;
         if there is a difference as a result of the comparison, secondarily setting the BS value of the currently selected boundary to 2;
         if there is no difference as a result of the coding, setting the BS value of the currently selected boundary to 1 or 0 according to predetermined conditions.

3. The method as claimed in claim 2, wherein, in the step of setting the BS value comprises the step of:
   setting the BS value to 1 according to whether the boundary blocks have an equal reference picture, or whether a difference in motion vector values in a horizontal direction or a vertical direction of the boundary blocks is more than a predetermined value.

4. The method as claimed in claim 1, wherein the step of estimating the BS values comprises the steps of:
   sequentially selecting the macro blocks, and selecting one of the boundaries based on the currently unselected direction in boundaries of the selected macro block;
   selecting secondary boundary blocks based on the selected boundary;
   determining if the secondary boundary blocks are intra-coded blocks;
      if the secondary boundary blocks are the intra-coded blocks, setting a BS value of the boundary based on the currently unselected direction of the secondary boundary blocks to 4 or 3 according to whether the selected boundary corresponds to a macro block boundary;
      if the boundary blocks are not the intra-coded blocks, and if a previously computed BS value of the secondary boundary blocks is 2, setting the BS value of the boundary based on the currently unselected direction of the secondary boundary blocks to 2;
      if the boundary blocks are not the intra-coded blocks, and if the previously computed BS value of the secondary boundary blocks is 1 or 0, setting the BS value of the boundary based on the currently unselected direction of the secondary boundary blocks to 0.

5. A deblocking filter comprising:
a block divider for dividing received image data into macro blocks of a preset size, and selecting boundary blocks based on a boundary in a direction selected from the group consisting of: a vertical direction and a horizontal direction;
a BS value computation unit for computing Boundary Strength (BS) values for boundaries between the boundary blocks based on the currently selected direction;
a BS value estimation unit for estimating BS values of boundary blocks based on a currently unselected direction by using the previously computed BS values of the boundary blocks;
a filtering unit for performing filtering for the boundaries in the vertical or horizontal direction according to a deblocking filtering method; and
a controller for:
selecting either the vertical direction or the horizontal direction,
controlling the BS value computation unit so as to compute the BS values for the boundaries based on the currently selected direction,
controlling the BS value estimation unit so as to estimate the BS values for the boundaries based on the currently unselected direction by using the computed the BS values when the BS values for the boundaries based on all the currently unselected directions of the image data are computed; and
controlling the filtering unit so as to perform filtering in the horizontal or vertical direction by using the computed or estimated BS values.

6. The deblocking filter as claimed in claim 5, wherein the BS value computation unit computes the BS value based on the selected direction boundary according to:
whether boundary blocks are intra-coded blocks;
whether there is a difference in Coded Block Pattern (CBP) values when they are not the intra-coded blocks;
whether the boundary blocks have an equal reference picture:
whether a difference in motion vector values between the boundary blocks is more than a predetermined value; and
whether the boundary blocks correspond to a block boundary of the macro block when they are the intra-coded blocks.

7. The deblocking filter as claimed in claim 6, wherein the BS value computation unit:
sets a BS value of the currently selected boundary to 4 or 3 according to whether the selected boundary corresponds to the boundary of the macro block when they are the intra-coded blocks;
sets the BS value of the currently selected boundary to 2 if there is a difference in the boundary blocks as a result of comparing CBP values of the boundary blocks when they are not the intra-coded blocks, and
sets the BS value of the currently selected boundary to 1 or 0 according to whether the boundary blocks have the equal reference picture, or whether the difference in the motion vector values in the selected direction of the boundary blocks is more than the predetermined value when there is no difference in the boundary blocks as a result of the coding.

8. The deblocking filter as claimed in claim 5, wherein the BS value estimation unit estimates the BS value of the currently selected boundary in the unselected direction according to whether boundary blocks based on a boundary are blocks coded based on an intra mode, and whether the boundary to be estimated corresponds to a boundary surface of the macro block when they are not the intra-coded blocks.

9. The deblocking filter as claimed in claim 8, wherein the BS value estimation unit sequentially:
selects the macro blocks,
selects one of the boundaries based on the currently unselected direction in boundaries of the selected macro block,
selects boundary blocks based on the selected boundary,
sets a BS value of the boundary to 4 or 3 according to whether the selected boundary corresponds to a macro block boundary when they are the intra-coded blocks,
sets the BS value of the boundary based on the currently unselected direction of the boundary blocks to 2 when they are the intra-coded blocks and when a previously computed BS value of the boundary blocks is 2, and
sets the BS value of the boundary based on the currently unselected direction of the boundary blocks to 0 when the previously computed BS value of the boundary blocks is 1 or 0.

10. A computer-program product comprising machine executable code stored on a non-transitory machine readable medium that provides instruction to a computer system for performing deblocking filtering of image data divided into a plurality of macro blocks, the computer system executing the steps of:
computing Boundary Strength (BS) values for boundaries based on a selected direction of the image data, wherein the direction is selected from the group consisting of vertical and horizontal directions;
performing filtering based on the selected direction by using the computed BS values;
estimating BS values for boundaries based on the unselected direction by using the computed BS values; and
performing filtering based on the unselected direction by using the estimated BS values.

11. The computer program product as claimed in claim 10, wherein the step of computing the BS values comprises the steps of:
dividing the macro blocks into a plurality of blocks;
sequentially selecting the macro blocks, and selecting one of the boundaries based on the currently selected direction in boundaries of the currently selected macro block;
selecting boundary blocks based on the currently selected boundary;
determining if the boundary blocks are intra-coded blocks;
if the boundary blocks are the intra-coded blocks, primarily setting a BS value of the currently selected boundary to 4 or 3 according to whether the currently selected boundary corresponds to a macro block boundary;
if the boundary blocks are not the intra-coded blocks, comparing Coded Block Pattern (CBP) values of the boundary blocks;
if there is a difference as a result of the comparison, secondarily setting the BS value of the currently selected boundary to 2;
if there is no difference as a result of the coding, setting the BS value of the currently selected boundary to 1 or 0 according to predetermined conditions.

12. The computer program product as claimed in claim 11, wherein, in the step of setting the BS value comprises the step of:

setting the BS value to 1 according to whether the boundary blocks have an equal reference picture, or whether a difference in motion vector values in a horizontal direction or a vertical direction of the boundary blocks is more than a predetermined value.

13. The computer program product as claimed in claim 10, wherein the step of estimating the BS values comprises the steps of:
- sequentially selecting the macro blocks, and selecting one of the boundaries based on the currently unselected direction in boundaries of the selected macro block;
- selecting secondary boundary blocks based on the selected boundary;
- determining if the secondary boundary blocks are intra-coded blocks;
- if the secondary boundary blocks are the intra-coded blocks, setting a BS value of the boundary based on the currently unselected direction of the secondary boundary blocks to 4 or 3 according to whether the selected boundary corresponds to a macro block boundary;
- if the boundary blocks are not the intra-coded blocks, and if a previously computed BS value of the secondary boundary blocks is 2, setting the BS value of the boundary based on the currently unselected direction of the secondary boundary blocks to 2;
- if the boundary blocks are not the intra-coded blocks, and if the previously computed BS value of the secondary boundary blocks is 1 or 0, setting the BS value of the boundary based on the currently unselected direction of the secondary boundary blocks to 0.

* * * * *